US005991997A

United States Patent [19]
Schley et al.

[11] Patent Number: 5,991,997

[45] Date of Patent: Nov. 30, 1999

[54] HOSE PLIERS & METHOD

[76] Inventors: Paul E. Schley, 5511 E. Cerritos Ave.; Timothy P. Hume, 1653 N. Dressage St., both of Orange, Calif. 92869; Paul D. Predential, 2425 Wrangler La., Cocoa, Fla. 32926-5154

[21] Appl. No.: 09/020,129

[22] Filed: Feb. 6, 1998

[51] Int. Cl.$^{6}$ ..................................................... B23P 19/00

[52] U.S. Cl. ............................... 29/426.5; 29/268; 81/420

[58] Field of Search .................................. 29/268, 426.5; 81/424.5, 420, 426.5, 418, 421, 424

[56] References Cited

U.S. PATENT DOCUMENTS

| | | |
|---|---|---|
| 1,114,649 | 10/1914 | Reed . |
| 1,617,703 | 2/1927 | Christianson . |
| 1,910,750 | 5/1933 | Clark . |
| 2,637,236 | 5/1953 | Vergnani et al. . |
| 3,263,535 | 8/1966 | Zurcher . |
| 3,842,696 | 10/1974 | Wayne . |
| 4,725,049 | 2/1988 | Cantarinhas . |
| 5,305,669 | 4/1994 | Kimbro et al. . |

OTHER PUBLICATIONS

MAC Tools 1997 Catalog, pp. 114,310.

*Primary Examiner*—David P. Bryant
*Attorney, Agent, or Firm*—Connors & Assoc.; John J. Connors

[57] ABSTRACT

A pliers for a hose includes a pair of arms pivotally connected together at intermediate portions of the arms. Each arm has a handle section and an end section opposite the handle section, and a "floating" gripper attached to the end section of each arm. Each gripper has an internal surface which substantially conforms to the configuration of a portion of the external surface of the hose being engaged by the grippers upon grasping the hose with the pliers.

21 Claims, 5 Drawing Sheets

HOSE PLIERS & METHOD

BACKGROUND OF THE INVENTION

1. Field of the Invention

This invention relates to a hose pliers used to attach or detach a hose to a point of connection such as a nipple or the like, and particularly to hose pliers used in the automotive industry for attaching and detaching automotive hoses in an engine.

2. Background Discussion

In many industries, hoses are attached or detached to nipples located in areas which are very difficult to access. Sometimes such hoses attached to nipples become over time difficult to remove. This commonly occurs in the automotive industry where hoses carrying water and other engine fluids must be attached to nipples which are difficult to locate, or have become bonded to nipples and are very difficult to remove. Saw-toothed pliers are commonly employed to grasp the hose and twist it to remove it from the nipple. The saw teeth of such pliers can easily damage the hoses, which are typically made of rubber reinforced, for example, with nylon cords. Such automotive hoses usually have a cylindrical shape with outside diameters ranging typically from about 0.25 to about 3.5 inches, and inside diameters ranging from about 0.125 to about 3.375 inches.

SUMMARY OF THE INVENTION

It is the objective of this invention to provide a hose pliers which enables a user to grasp conveniently the hose without damaging it. It is also an objective of this invention to provide a hose pliers adapted to be oriented at substantially a right angle to the longitudinal axis of the hose for removing the hose by twisting it with the pliers, and also to be oriented substantially parallel to the longitudinal axis of the hose for pushing or pulling the hose towards or away from a nipple or other point of connection.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include ease of use and manufacture, self-alignment of grippers, avoidance of damage to the hose, and providing access to hard to reach locations.

The first feature of the pliers of this invention is that it can grasp hoses having different external surface configurations. For example, it may be used with cylindrical hoses having a range of diameters which differ by as much a 35 percent of the nominal hose diameter for which the pliers is designed to grip.

The second feature is that the pliers includes a pair of arms pivotally connected together at intermediate portions of the arms. Each arm has a handle section and an end section opposite the handle section to which is attached a gripper for grasping the hose. The end sections form a yoke member with a configuration which, when the grippers are grasping the hose, allows the arms to be moved between a position where they are at a right angle to the hose and to a position where they are substantially parallel to the hose. A mounting element at each end section attaches each gripper to each arm to enable each gripper to self align with the portions of the external surface of the hose being grasped. Consequently, during engagement, the internal surfaces of the grippers contact and are in registration with, and are oriented substantially the same as, the portions of the external surface of the hose being grasped.

The third feature is the manner of attaching the grippers. Each gripper may independently rotate in either a clockwise or counter clockwise direction, and each gripper is mounted to move laterally towards and away from the end section to which it is attached and to pivot about the mounting element which extends inward from each end section. The mounting elements for each gripper are aligned with each other so the grippers face each other. The grippers are rotatably attached to the end section of each arm.

The fourth feature is the configuration of the grippers. Each gripper has an internal surface which substantially conforms to the configuration of a portion of the external surface of the hose being engaged by the grippers upon grasping the hose with the pliers. Preferably, each gripper is a longitudinal section of a cylinder, with the internal surfaces of the grippers being substantially concave and having a first radius. Upon grasping the hoses, the concave surfaces are concentric with the longitudinal axis of the hose. The internal surfaces of the grippers preferably include at least one rib member which is a section of a circle having a second radius different than the first radius of the internal surface to which it is attached. The first radius is greater than the second radius. Preferably, there is at least one opening in the internal surface of each gripper, preferably in the ribs.

The fifth feature is that the structure of the yoke member includes the handle sections of the arms which are disposed substantially in the same plane and the end sections each have a wall member that is substantially at a right angle with respect to this plane. Each wall member has a distal end from which one of the mounting elements extends and a proximal end near the intermediate portions of the arms where the arms are pivotally connected together. For each wall member, the distal end is further from the plane of the handles than the proximal end and each wall member tapers from the distal end to the proximal end.

This invention also includes several methods of using the pliers. One method is for detaching a hose from a point of connection. A second method is for attaching a hose from a point of connection. A third method is for detaching a hose from a first point of connection and then attaching the hose to a second point of connection without releasing the grip of the pliers.

BRIEF DESCRIPTION OF THE DRAWING

The preferred embodiment of this invention, illustrating all its features, will now be discussed in detail. This embodiment depicts the novel and non-obvious hose pliers and method of this invention as shown in the accompanying drawing, which is for illustrative purposes only. This drawing includes the following figures (FIGS.), with like numerals indicating like parts.

DETAILED DESCRIPTION OF THE PREFERRED EMBODIMENT

Figure 1:
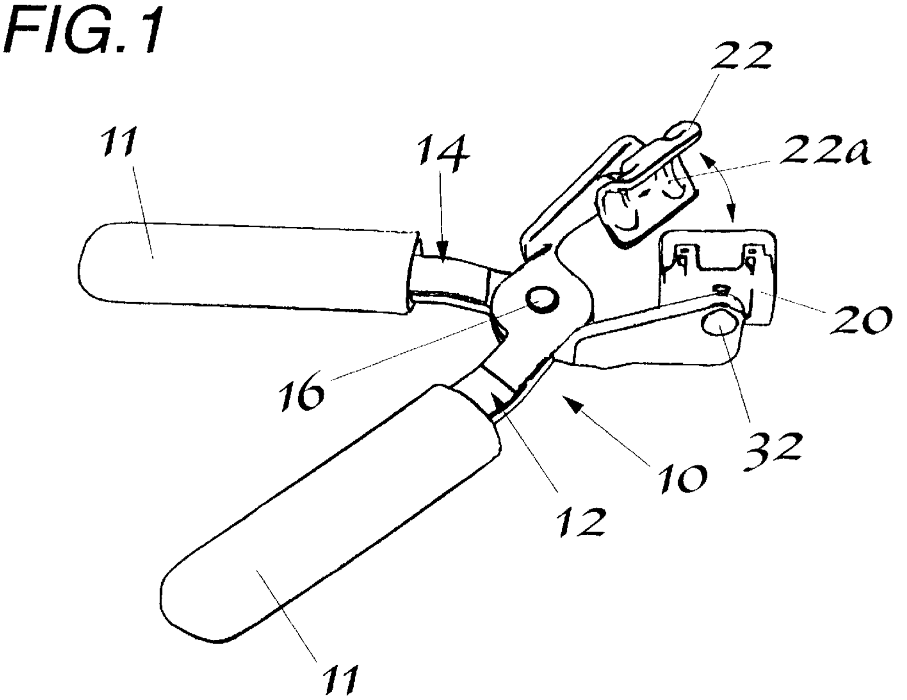
FIG. 1 is a perspective view of the hose pliers of this invention.

As shown in FIGS. 1 through 5, the hose pliers 10 of this invention includes a pair of arms 12 and 14 and a pair of grippers 20 and 22, respectively attached to the arms. The grippers 20 and 22 are attached to the arms 12 and 14 in a manner that allows each gripper to rotate independently clockwise or counterclockwise and pivot and move laterally. The pliers 10 is used to grasp a hose 30 (FIGS. 10 and 11), clamping the hose tightly between the floating, self aligning grippers 20 and 22, which are easily manually manipulated to position the hose therebetween.

Each arm 12 and 14 has handle sections 12*a* and 14*a*, respectively, and end sections 12*b* and 14*b*, respectively, opposite the handle sections. Plastic grips 11 are seated on the handle sections 12*a* and 14*a*. In the arms 12 and 14 there are intermediate portions in the form of enlarged circular-like members 12*c* and 14*c*, respectively. The arms 12 and 14 are attached to each other by means of a fastener 16 (FIGS. 1, 10, and 11) which extends through openings 12*d* and 14*d*, respectively, in the circular-like members 12*c* and 14*c*. The arms 12 and 14 are each bent slightly at B1 and B2, respectively, so that, upon attachment of the arms, each handle section 12*a* and 14*a* lies substantially in the same plane.

The end sections 12*b* and 14*b* include flat, triangular shaped wall members 12*e* and 14*e*, respectively, that are generally at a right angle with respect to the plane in which the handle sections 12*a* and 14*a* lie. A distal end 12*f* of the triangular wall member 12*e* has a height h1 which is less than the height h2 of the distal end 14*f* of the triangular wall member 14*e*. When the arms 12 and 14 are connected together by the fastener 16, the openings 12*d* and 14*d* are aligned with each other, and upper side edges 12*g* and 14*g*, respectively of the triangular wall members 12*e* and 14*e*, are substantially in the same plane. The lower side edges 12*i* and 14*i*, respectively of the triangular wall members 12*e* and 14*e*, are not in the same plane when the arms 12 and 14 are connected.

Figure 10:
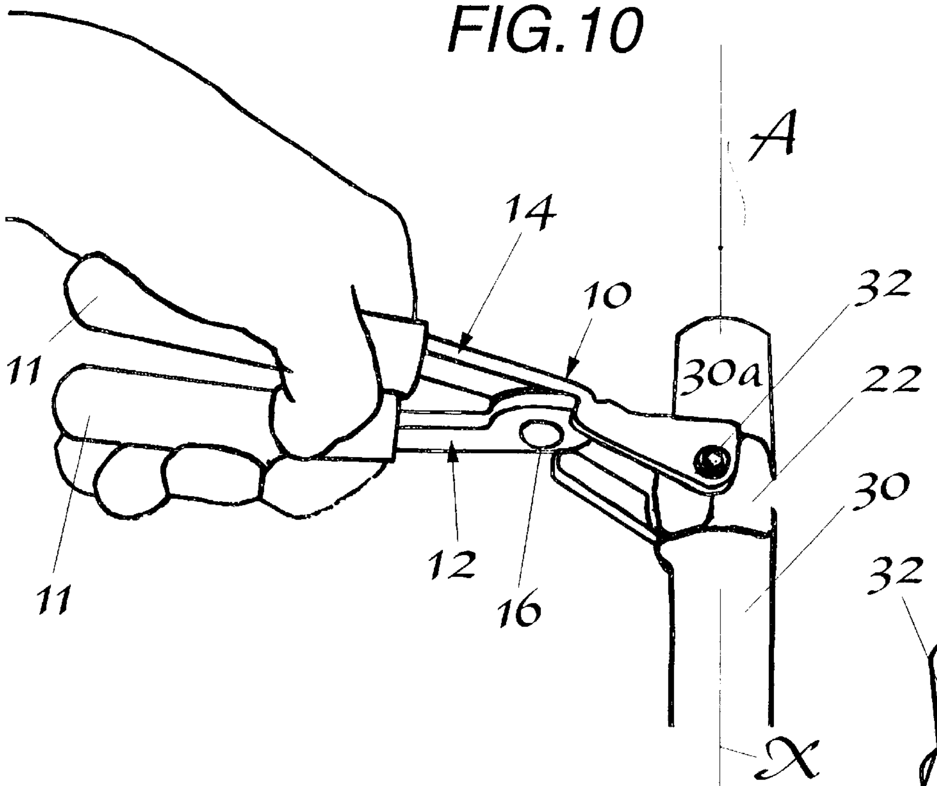
FIG. 10 is a perspective view showing a user grasping a hose with the pliers of this invention, with the body of the pliers oriented substantially at a right angle to the longitudinal axis of the hose for detaching the hose by twisting or rotating it relative to its point of connection.
Figure 11:
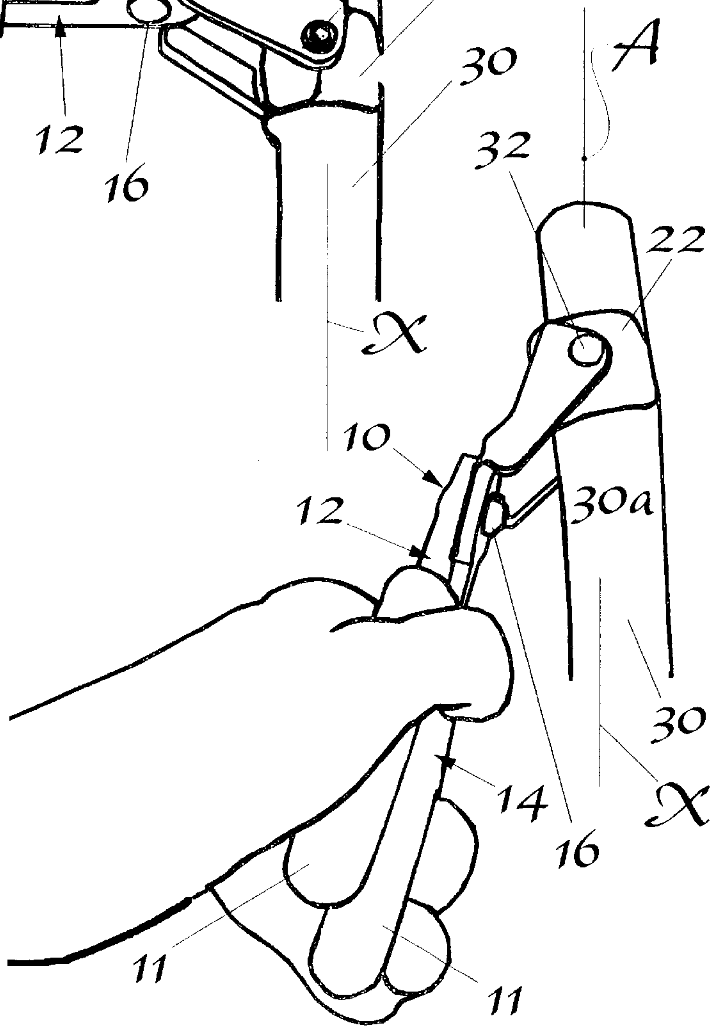
FIG. 11 is a perspective view showing a user grasping a hose with the body of the hose pliers of this invention oriented so that the pliers' body is substantially parallel to the longitudinal axis of the hose, enabling the user to push or pull the hose towards or away from its point of connection.

Near the distal ends 12*f* and 14*f* are openings 12*j* and 14*j* used for attaching the grippers 20 and 22, respectively to the arms 12 and 14. The side edges 12*g* and 14*g* of the triangular wall members 12*e* and 14*e* each slope inward and downward towards their respective proximal ends 12*h* and 14*h*, which are near the intermediate portions 12*d* and 14*d*. Thus, each triangular wall member 12*e* and 14*e* has one side edge 12*g* and 14*g*, respectively, which slopes inward and tapers downward towards its proximal end. This is an important feature that allows the wall members 12*e* and 14*e* of the arms 12 and 14 to form a yoke member which enables the arms to be brought substantially parallel with the hose 30, as illustrated in FIG. 11, or at a right angle to the hose, as illustrated in FIG. 10. As discussed in greater detail subsequently, the pliers 10 can thus be used to twist or rotate a hose which it is grasping or be used to push or pull a hose towards or away from a point of connection.

Figure 6:
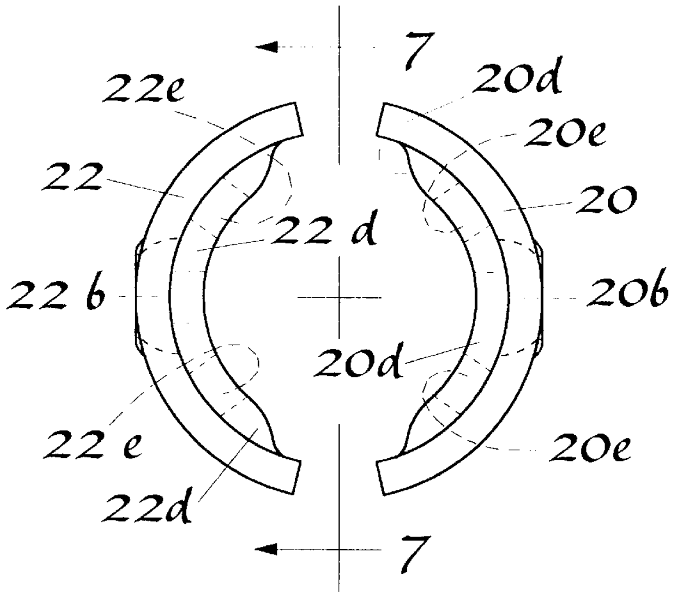
FIG. 6 is an end view of the grippers used in the hose pliers of this invention, with the concave, internal surfaces of the grippers facing each other.
Figure 8:
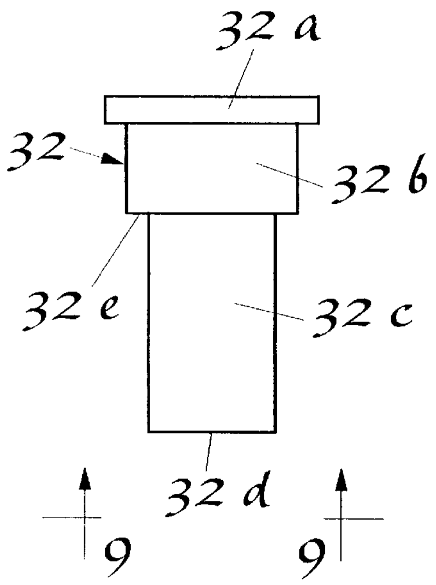
FIG. 8 is a side-elevational view of a rivet which is used as the mounting element to attach a gripper to an arm.
Figure 7:
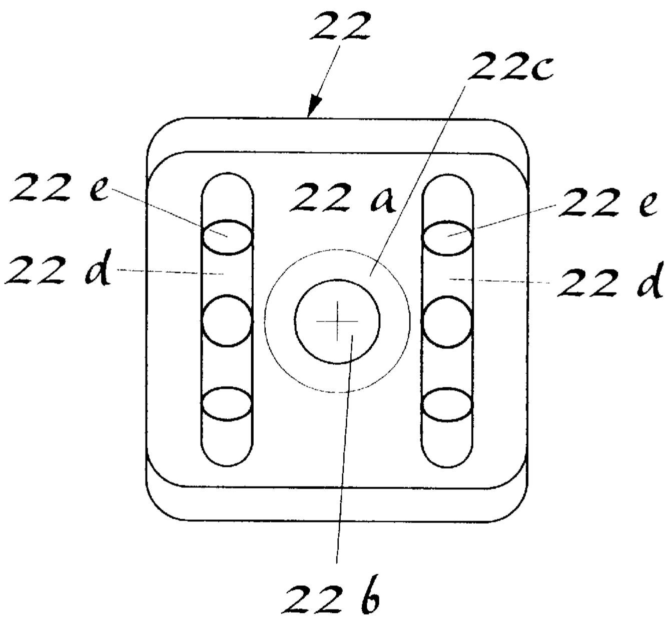
FIG. 7 is a sectional view taken along line 7—7 of FIG. 6.
Figure 9:
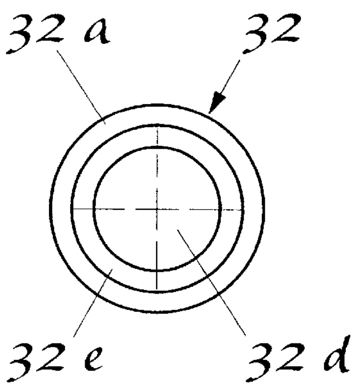
FIG. 9 is a sectional view taken along line 9—9 of FIG. 8.

Each gripper 20 and 22 is attached by, for example, a rivet 32 (FIG. 8) to each of the distal ends 12*f* and 14*f*, respectively. The grippers 20 and 22 are not in a fixed position by the rivets 32, but each may rotate independently about a rivet. These grippers 20 and 22 are longitudinal, rectangular sections of a cylinder which has a diameter preferably slightly larger than the diameter of the hose 30 to be grasped. Each gripper 20 and 22 has an internal, concave surface, only surface 22*a* of the gripper 22 is shown. As shown in FIG. 6, these concave surfaces of the grippers 20 and 22 face each. Even if not so initially oriented, the grippers 20 and 22 will come into the same orientation upon engaging the hose 30, so that, the concave internal surfaces of the grippers, upon contact with the hose surface 30*a*, will be concentric with the longitudinal axis X of the hose 30. These allows for many angles of attack when using the pliers 10. Each of these internal surfaces of the grippers 20 and 22 substantially conforms to the configuration of the portion of the external surface 30*a* of the hose 30 being engaged by a gripper when grasping the hose with the pliers 10. Because of the cylindrical configuration of the grippers 20 and 22, the circular cross-sectional shape of the hose 30 is maintained upon grasping it with the pliers of this invention. Thus, the hose 30 is not damaged.

Each gripper 20 and 22 has therein a central hole 20*b* and 22*b* that provides a passageway for the rivet 32. On opposite sides of the each of the central holes 20*b* or 22*b* are ribs 20*d* and 22*d*. The ribs 20*d* and 22*d* are each sections of a circle. The radii of these ribs 20*d* and 22*d* is less than the radii of the walls defining the surfaces (only the surface 22*a* is shown) of the grippers 20 and 22. Because of this difference in radii, the grippers 20 and 22 will accommodate hoses 30 of varying diameters within a predetermined range. For example, if the grippers 20 and 22 are designed to grasp a hose with a diameter of one inch, the use of the ribs, which is optional, enables the grippers to also effectively grasp a hose which has a diameter that varies plus or minus ⅜ inch. Optionally, in each rib 20*d* and 22*d* is a series of openings 20*e* and 22*e*, respectively.

Figure 13:
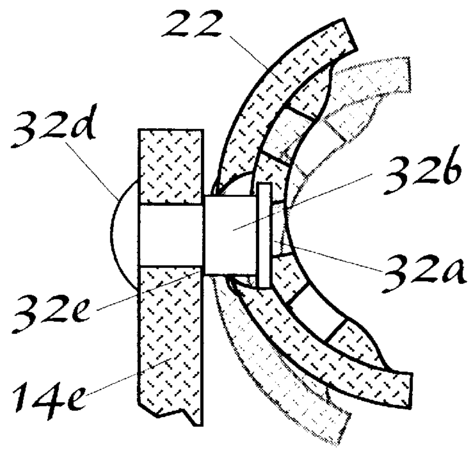
FIG. 13 is a fragmentary cross-sectional view of a gripper connected by a rivet to an arm showing the manner of attachment for self alignment of the gripper during use.

The rivet 32 comprises a disc-shaped head 32*a*, a short bearing section 32*b*, and an elongated, cylindrical shaft 32*c* terminating in an outer end 32*d*. The diameter of the shaft 32*c* is less than the diameter of the bearing section 32*b*, and the diameter of the bearing section 32*b* is less than the diameter of the head 32*a*. The shaft 32*c* passes through the central hole 20*b* or 22*b* as the case may be in the gripper 20 or 22, with a step 32*e* between the bearing section 32*b* and shaft 32*c* engaging the inside surface of the wall member 12*e* or 14*e* as the case may be. FIG. 13 shows the step 32*e* resting against the inside of the wall member 14*e*. The head 32*a* is disposed in a circular depression 20*c* or 22*c*, as the case may be, on the internal, concave surfaces of the grippers 20 and 22. After the shaft 32*c* passes through the hole 20*b* or 22*b* in the grippers and the openings 12*j* and 14*j* in the wall members 12*e* and 14*e*, the outer ends 32*d* are forged to create an enlarged end 32*d*' (FIG. 13) to fix the rivets 32 in position. The length of the bearing section 32*b* is substantially longer than the thickness of the walls of the grippers 20 and 22, so that each gripper can move laterally towards and away from the inside of the wall members 12*e* or 14*e* to which it is attached and pivot as well as rotate independently and freely around the bearing section 32*b* in either a clockwise or counterclockwise direction.

Consequently, the grippers 20 and 22 are self aligning during use. The manner in which the rivets 32 attach each gripper 20 and 22 to each arm 12 and 14 enable each gripper to self align with the portions of the external hose surface 30*a* being grasped so that, during engagement of the concave internal surfaces (only surface 22*a* being shown) of the grippers with the surface 30*a* of the hose 30, these internal surfaces contact the hose surface 30*a* and are in registration and oriented substantially the same as the portions of the hose surface being grasped. This "free floating" attachment is shown in dotted lines in FIG. 13, which depicts the grippers 20 and 22 moving along the bearing section 32*b* towards or away from the triangular shaped wall members 12*e* or 14*e*, as the case may, upon engaging the hose surface 30*a* and pivoting and rotating until properly oriented so that the concave internal surfaces (only surface 22*a* being shown) of the grippers contact the hose surface and are concentric with the longitudinal axis X of the hose.

Figure 12:
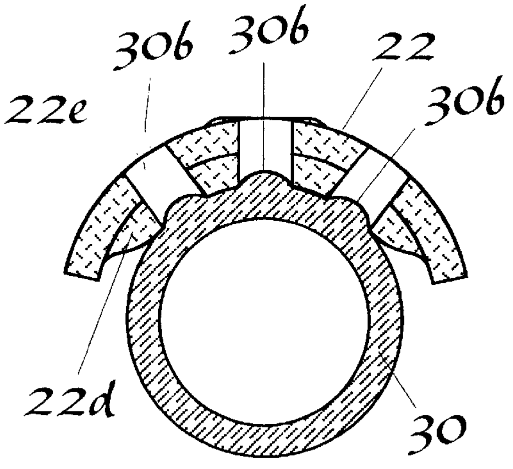
FIG. 12 is a fragmentary cross-sectional view of a hose in the grip of the grippers of the hose pliers of this invention, showing the portions of the surface of the hose being pushed into holes in the grippers.
Figure 2:
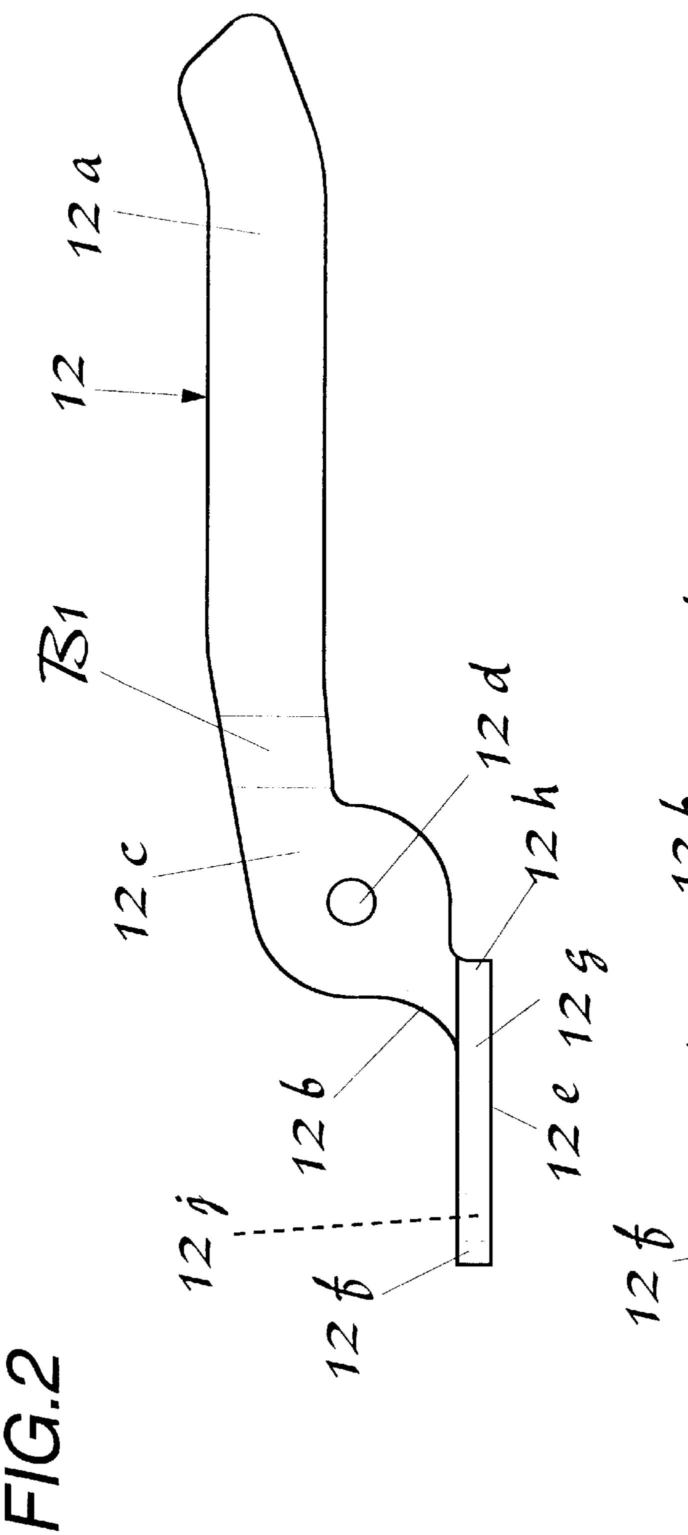
FIG. 2 is a plan view of one of the arms of the hose pliers of this invention.
Figure 3:
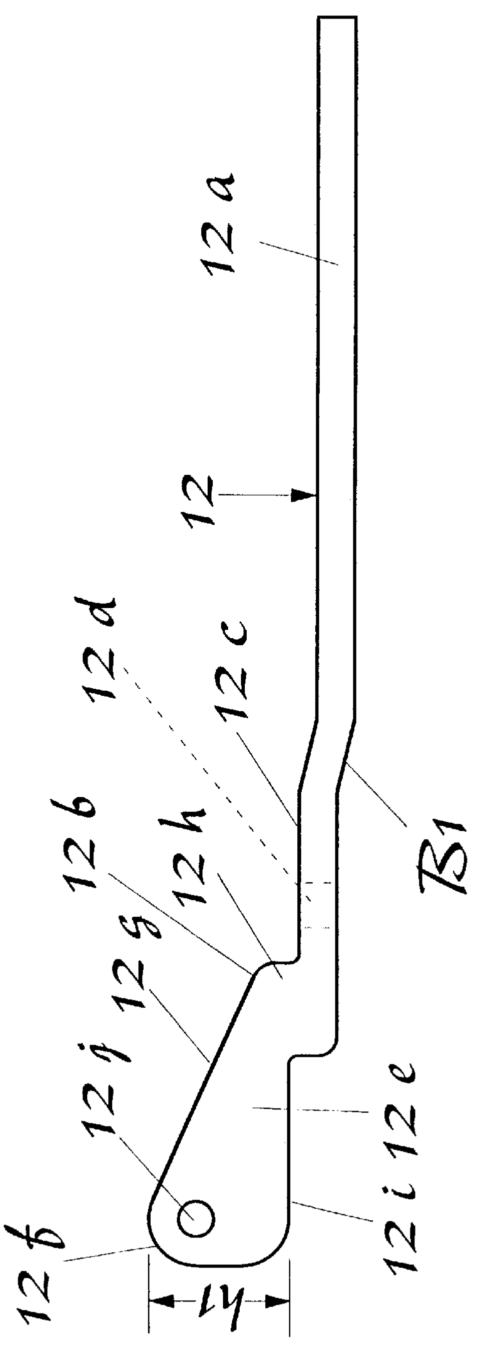
FIG. 3 is a side-elevational view of the arm shown in FIG. 2.
Figure 4:
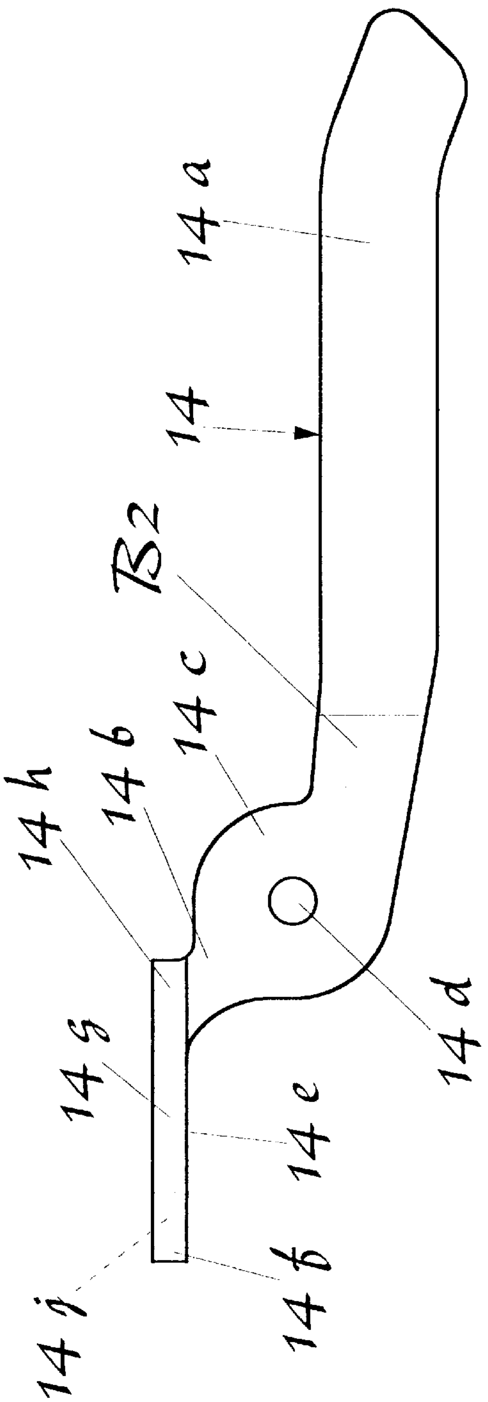
FIG. 4 is a plan view of the other arm of the hose pliers of this invention.
Figure 5:
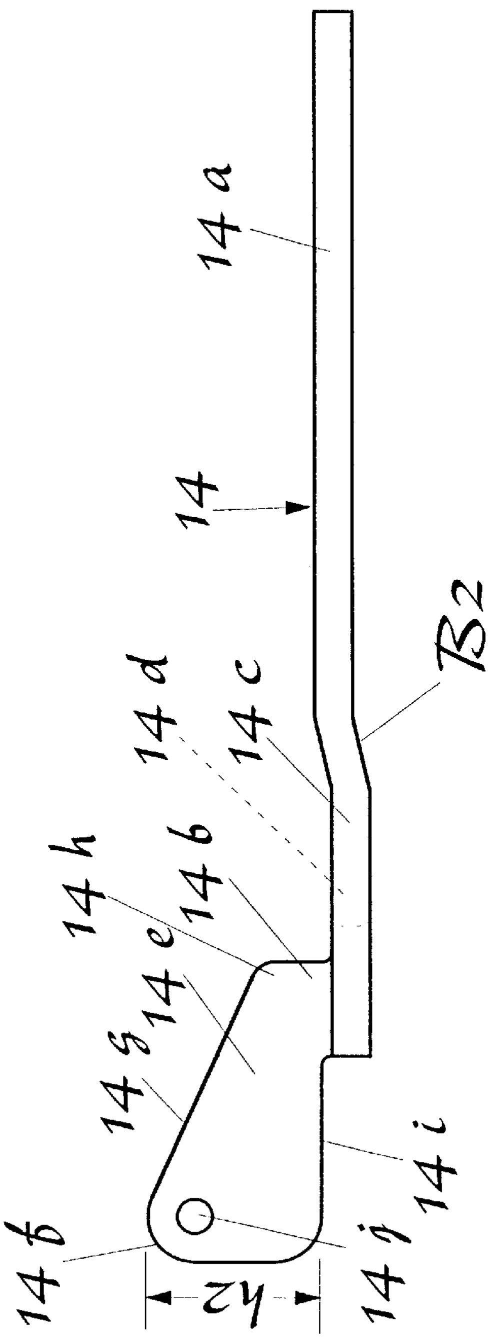
FIG. 5 is a side-elevational view of the arm shown in FIG. 4.

The manner in which the pliers 10 is used is illustrated in FIGS. 10 and 11. The hose pliers of this invention may be used to either rotate (FIG. 10) a hose 30 relative to its point of connection A, or to push or pull (FIG. 11) the hose towards or away from a point of connection A. When used to rotate the hose 30, the arms 12 and 14 of the pliers 10 are oriented substantially at a right angle with respect to the longitudinal axis X of the hose 30. The grippers 20 and 22 grasp the hose 30 between them, with the concave surfaces (only surface 22*a* shown) of the grippers pressing against external cylindrical portions 30*a* of the hose. Thus, during engagement, the concave surfaces of the grippers 20 and 22 are concentric with the longitudinal axis X. As the user presses the handle sections 12*a* and 14*a* towards each other, the hose 30 is pressed between the grippers 20 and 22, and, as shown in FIG. 12, parts 30*b* of the hose surface 30*a* are pressed into the openings 20*e* and 22*e* in the ribs 20*d* and 22*d*, enhancing the grip so that the pliers 10 do not slip relative to the surface 30*a* of the hose 30. Thus, the openings 20*e* and 22*e* grip like an octopus.

As shown in FIG. 11, when the pliers 10 are used to push onto or pull away from the point of connection A, the arms 12 and 14 are oriented substantially parallel to the longitudinal axis X of the hose 30, while the grippers 20 and 22 clamp the hose between them. Because of the triangular configuration of the wall members 12*e* and 14*e* and the spacing between the wall members 12*e* and 14*e*, there is sufficient clearance to enable the pliers 10 to be moved into the parallel position depicted in FIG. 11. Thus, the user may grasp a hose 30 connected to a nipple with the pliers 10 positioned at a right angle as shown in FIG. 10, twist to loosen the hose from the nipple, then without releasing the grip of the pliers re-orient the pliers parallel to longitudinal axis X of the hose as shown in FIG 11 and pull the hose free of the nipple, and still without releasing the grip of the pliers push the hose onto another nipple.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

We claim:

1. A pliers for grasping a hose having an external surface of a predetermined configuration, including a pair of arms pivotally connected together at intermediate portions of the arms, each arm having a handle section and an end section opposite the handle section, and a gripper rotatably attached to the end section of each arm, each gripper having an internal surface which substantially conforms to the configuration of a portion of the external surface of the hose being engaged by the grippers upon grasping the hose with the pliers and each gripper being mounted to pivot about a mounting element extending inward from each end section, said mounting elements being aligned with each other, said handle sections of the arms being substantially disposed in the same plane and the end sections each having a wall member which is substantially at a right angle with respect to said plane, each wall member having a distal end from which one of the mounting elements extends and a proximal end near the intermediate portions of the arms where the arms are pivotally connected together.

2. The pliers of claim 1 where each gripper may independently rotate in either a clockwise or counter clockwise direction.

3. The pliers of claim 1 where each gripper is mounted to move laterally towards and away from the end section to which each gripper is attached.

4. The pliers of claim 1 where the grippers face each other.

5. The pliers of claim 1 where, for each wall member, the distal end is further from said plane than the proximal end and each wall member tapers from the distal end to the proximal end.

6. The pliers of claim 1 where the internal surface of each gripper is a longitudinal section of a cylinder having a first radius, said internal surface including at least one rib member which is a section of a circle having a second radius different than the first radius.

7. The pliers of claim 6 where the first radius is greater than the second radius.

8. The pliers of claim 7 where there is at least one opening in the internal surface of each gripper.

9. A pliers for grasping a hose having an external surface of a predetermined configuration, including a pair of arms pivotally connected together at intermediate portions of the arms, each arm having a handle section and an end section opposite the handle section, and a gripper rotatable attached to the end section of each arm, each gripper having an internal surface which substantially conforms to the configuration of a portion of the external surface of the hose being engaged by the grippers upon grasping the hose with the pliers, the end sections forming a yoke member that allows the arms, when the grippers are grasping the hose, to be moved between a position where the arms are at a right angle to the hose and a position where the arms are substantially parallel to the hose.

10. A pliers for grasping a hose having a substantially cylindrical external surface, including a pair of arms pivotally connected together at intermediate portions of the arms, each arm having a handle section and an end section opposite the handle section, and a gripper attached to the end section of each arm, with each gripper being (i) a longitudinal, rectangular section of a cylinder which provides a concave gripping surface, (ii) pivotally attached to a mounting element extending inward from each end section, and (iii) mounted on the mounting member to freely and independently rotate in either a clockwise or counter clockwise direction, each of said mounting elements being aligned with each other and said grippers being disposed so that each of their respective concave gripping surfaces face each other, said handle sections of the arms being substantially disposed in the same plane and the end sections each having a wall member which is substantially at a right angle with respect to said plane, each wall member having a distal end from which one of the mounting elements extends and a proximal end near the intermediate portions of the arms where the arms are pivotally connected together.

11. The pliers of claim 10 where each gripper is mounted to move laterally towards and away from the end section to which each gripper is attached.

12. The pliers of claim 10 where, for each wall member, the distal end is further from said plane than the proximal end and each wall member tapers from the distal end to the proximal end.

13. The pliers of claim 10 where each of the concave gripping surfaces have a first portion with a first radius and a second portion with a second radius different than the first radius.

14. The pliers of claim 13 where the first radius is greater than the second radius.

15. The pliers of claim 14 where there is at least one opening in the concave gripping surface of each gripper.

16. A pliers for grasping a hose having a substantially cylindrical external surface, including a pair of arms pivotally connected together at intermediate portions of the arms, each arm having a handle section and an end section opposite the handle section, and a gripper attached to the end section of each arm, with each gripper being (i) a longitudinal, rectangular section of a cylinder which provides a concave gripping surface, (ii) pivotally attached to a mounting element extending inward from each end section, and (iii) mounted on the mounting member to freely and independently rotate in either a clockwise or counter clockwise direction, each of said mounting elements being aligned with each other and said grippers being disposed so that each of their respective concave gripping surfaces face each other, the end sections forming a yoke member that allows the arms, when the grippers are grasping the hose, to be moved between a position where the arms are at a right angle to the hose and a position where the arms are substantially parallel to the hose.

17. A pliers for grasping a hose having an external surface of a predetermined configuration, including a pair of arms pivotally connected together at intermediate portions of the arms, each arm having a handle section and an end section opposite the handle section, a gripper at each end section of each arm, each gripper having an internal surface which substantially conforms to the configuration of a portion of the external surface of the hose being engaged by the grippers upon grasping the hose with the pliers, and a mounting element at each end section which attaches each gripper to each arm to enable each gripper to self align with the portions of the external surface of the hose being grasped so that, during engagement, the internal surfaces of the grippers contact and are in registration and oriented substantially the same as the portions of the external surface of the hose being grasped, the end sections forming a yoke member that allows the arms, when the grippers are grasping the hose, to be moved between a position where the arms are at a right angle to the hose and a position where the arms are substantially parallel to the hose.

18. A method of detaching a hose from a point of connection comprising gripping the hose with a pliers and rotating to loosen the hose from the point of connection and while maintaining the grasp of the hose with the pliers pulling the hose free of the point of connection, said hose having an external surface of a predetermined configuration, and said pliers including a pair of arms pivotally connected together at intermediate portions of the arms, each arm having a handle section and an end section opposite the handle section, and a gripper rotatably attached to the end section of each arm, each gripper having an internal surface which substantially conforms to the configuration of a portion of the external surface of the hose being engaged by the grippers upon grasping the hose with the pliers' said end sections forming a yoke member that allows the arms, when the grippers are grasping the hose, to be moved between a position where the arms are at a right angle to the hose and a position where the arms are substantially parallel to the hose.

19. A method of attaching a hose to a point of connection comprising gripping the hose with a pliers and pushing the hose onto the point of connection, said hose having an external surface of a predetermined configuration, and said pliers including a pair of arms pivotally connected together at intermediate portions of the arms, each arm having a handle section and an end section opposite the handle section, and a gripper rotatably attached to the end section of each arm, each gripper having an internal surface which substantially conforms to the configuration of a portion of the external surface of the hose being engaged by the grippers upon grasping the hose with the pliers, said end sections forming a yoke member that allows the arms, when the grippers are grasping the hose, to be moved between a position where the arms are at a right angle to the hose and a position where the arms are substantially parallel to the hose.

20. A method of detaching a hose from a first point of connection and attaching said hose to a second point of connection, comprising (a) grasping the hose with a pliers, said pliers including a pair of arms pivotally connected together at intermediate portions of the arms, each arm having a handle section and an end section opposite the handle section, a gripper at each end section of each arm, each gripper having an internal surface which substantially conforms to the configuration of a portion of the external surface of the hose being engaged by the grippers upon grasping the hose with the pliers, and a mounting element at each end section which attaches each gripper to each arm to enable each gripper to self align with the portions of the external surface of the hose being grasped so that, during engagement, the internal surfaces of the grippers contact and are in registration and oriented substantially the same as the portions of the external surface of the hose being grasped, (b) positioning the pliers at a right angle to the hose and twisting to loosen the hose from the first point of connection, (c) without releasing the grip of the pliers, re-orienting the pliers parallel to the hose, (d) pulling the hose free of the first point of connection, and (e) still without releasing the grip of the pliers, pushing the hose onto the second point of connection.

21. A pliers for grasping a hose having an external surface of a predetermined configuration, including a pair of arms pivotally connected together at intermediate portions of the arms, each arm having a handle section and an end section opposite the handle section, and a gripper at the end section of each arm mounted to rotate independently clockwise or counterclockwise and pivot and move laterally, each gripper having an internal, cylindrical surface with inwardly facing ribs thereon that have at least one opening extending there through.

* * * * *